US012338419B2

(12) United States Patent
Lopez et al.

(10) Patent No.: US 12,338,419 B2
(45) **Date of Patent: *Jun. 24, 2025**

(54) ALL-NATURAL CLEANER, LUBRICANT AND PROTECTANT COMPOSITION

(71) Applicant: Boar Products, LLC, Fargo, ND (US)

(72) Inventors: Adam Lopez, Fargo, ND (US); David Lopez, Richmond, MN (US)

(73) Assignee: Boar Products, LLC, Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,156

(22) Filed: May 30, 2024

(65) Prior Publication Data

US 2024/0400950 A1 Dec. 5, 2024

Related U.S. Application Data

(60) Provisional application No. 63/505,056, filed on May 30, 2023.

(51) Int. Cl.

| | |
|---|---|
| ***C11D 7/50*** | (2006.01) |
| ***C10M 109/00*** | (2006.01) |
| ***C10M 127/02*** | (2006.01) |
| ***C10M 169/04*** | (2006.01) |
| ***C11D 7/24*** | (2006.01) |
| ***C11D 7/44*** | (2006.01) |
| ***C11D 7/46*** | (2006.01) |
| ***C11D 17/00*** | (2006.01) |
| *C10N 50/02* | (2006.01) |

(52) U.S. Cl.

CPC ......... *C11D 7/5022* (2013.01); *C10M 109/00* (2013.01); *C10M 127/02* (2013.01); *C10M 169/04* (2013.01); *C11D 7/245* (2013.01); *C11D 7/44* (2013.01); *C11D 7/46* (2013.01); *C11D 17/0043* (2013.01); *C10M 2203/04* (2013.01); *C10N 2050/02* (2013.01)

(58) Field of Classification Search

CPC ............ C10N 2050/02; C10M 109/00; C10M 127/02; C10M 169/04; C10M 2203/04; C11D 7/5022; C11D 7/245; C11D 7/44; C11D 7/46; C11D 17/0043

See application file for complete search history.

(56) References Cited

U.S. PATENT DOCUMENTS

| | | | | |
|---|---|---|---|---|
| 4,465,883 | A | 8/1984 | Lopata | |
| 9,222,050 | B1 | 12/2015 | Simonetti | |
| 10,626,343 | B1 | 4/2020 | Scott | |
| 2019/0305896 | A1 | 10/2019 | Terry | |
| 2020/0339901 | A1 | 10/2020 | Shernine | |
| 2021/0290507 | A1 * | 9/2021 | Pesaro .................. | A61K 8/342 |

* cited by examiner

*Primary Examiner* — Vishal V Vasisth

(74) *Attorney, Agent, or Firm* — Fargo Patent & Business Law; Thomas Kading; Joshua Krank

(57) ABSTRACT

An all-natural multi-purpose cleaner, lubricant, and protectant composition includes 70-75 percent by weight Ethanol; 5-10 percent by weight D-Limonene; 1-5 percent by weight Lard; less than 1 percent by weight Beeswax; and 10-15 percent by weight Avocado Oil.

11 Claims, No Drawings

ALL-NATURAL CLEANER, LUBRICANT AND PROTECTANT COMPOSITION

CROSS REFERENCE TO RELATED APPLICATION[S]

The present disclosure claims priority to United States Provisional Patent Disclosure Ser. No. 63/505,056 filed May 30, 2023.

BACKGROUND

The present disclosure relates to an all-natural multi-purpose cleaner, lubricant and protectant composition that cleans, lubricates and protects outdoor equipment.

Proper care of outdoor equipment is a priority to assure function and longevity. Proper cleaning and maintenance of firearms is of particular consideration.

Traditionally, firearm users are encouraged to clean and oil their firearms after each use. Traditional firearm lubricants are intended to clean, lubricate and protect the metal components from rust. Traditional firearm lubricants are configured primarily as a barrier to keep metal parts from being exposed to oxygen and environmental oxidizing agents such as moisture.

SUMMARY

An all-natural multi-purpose cleaner, lubricant, and protectant composition, according to one disclosed non-limiting embodiment of the present disclosure includes 70-75 percent by weight Ethanol; 5-10 percent by weight D-Limonene; 1-5 percent by weight Lard; less than 1 percent by weight Beeswax; and 10-15 percent by weight Avocado Oil.

A further embodiment of any of the foregoing embodiments of the present disclosure includes, wherein the 70-75 percent by weight Ethanol comprises 380 grams.

A further embodiment of any of the foregoing embodiments of the present disclosure includes, wherein the 5-10 percent by weight D-Limonene comprises 36 grams.

A further embodiment of any of the foregoing embodiments of the present disclosure includes, wherein the 1-5 percent by weight Lard comprises 19 grams.

A further embodiment of any of the foregoing embodiments of the present disclosure includes, wherein the less than 1 percent by weight Beeswax comprises 3 grams.

A further embodiment of any of the foregoing embodiments of the present disclosure includes, wherein the 10-15 percent by weight Avocado Oil comprises 44 grams.

A further embodiment of any of the foregoing embodiments of the present disclosure includes, wherein the 70-75 percent by weight Ethanol comprises 358 grams.

A further embodiment of any of the foregoing embodiments of the present disclosure includes, wherein the 10-15 percent by weight Avocado Oil comprises 66 grams.

A further embodiment of any of the foregoing embodiments of the present disclosure includes, wherein the viscosity is sprayable from a spray bottle.

A further embodiment of any of the foregoing embodiments of the present disclosure includes, wherein the viscosity is about 1.0-1.2 cP at 25° C.

A process to manufacture an all-natural multi-purpose cleaner, lubricant, and protectant composition according to one disclosed non-limiting embodiment of the present disclosure includes heating Beeswax and deodorized Lard until melted; mixing in D-Limonene and Avocado Oil to the melted Beeswax and deodorized Lard while heating; and mixing in the heated D-Limonene, Avocado Oil, Beeswax and deodorized Lard to ethanol until the composition uniform.

A further embodiment of any of the foregoing embodiments of the present disclosure includes intermittently mixing the composition as the composition tends to separate.

A further embodiment of any of the foregoing embodiments of the present disclosure includes, wherein the intermittently mixing comprises mixing for 30 seconds to one minute every 15-20 minutes.

A further embodiment of any of the foregoing embodiments of the present disclosure includes filling spray bottles with the composition.

A further embodiment of any of the foregoing embodiments of the present disclosure includes, wherein heating the Beeswax and the deodorized Lard are heated to about 140 F.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

DETAILED DESCRIPTION

The all-natural multi-purpose cleaner, lubricant and protectant composition cleans, lubricates and protects various equipment such as firearms.

In some embodiments, the all-natural multi-purpose cleaner, lubricant and protectant composition includes Ethanol, D-Limonene, Lard, Beeswax, and Avocado Oil. As the main odor constituent of citrus (plant family Rutaceae), D-Limonene is used in food manufacturing and some medicines, e.g. as a flavoring to mask the bitter taste of alkaloids, and as a fragrant in perfumery. Lard is a semi-solid white fat product obtained by rendering the fatty tissue of a pig. The Lard may be deodorized. In some embodiments, other ingredients such as Methanol, Isopropyl Alcohol, etc., may be alternatively utilized for the Ethanol, Di pentene etc., may be alternatively utilized for the D-Limonene, tallow, coconut oil, etc., may alternatively be utilized for the lard, vegetable Oils, etc., may be alternatively utilized for the avocado oil, etc.

In other embodiments, the all-natural multi-purpose cleaner, lubricant and protectant composition includes the following weight percentages.

| INGREDIENTS | PERCENT RANGES | DESCRIPTION |
|---|---|---|
| Ethanol | 65-80% | Cleaning agent.<br>Low freezing point.<br>Emulsifier.<br>Derived from all-natural materials. |
| D-Limonene | 1-15% | Orange scent.<br>Strong cleaning agent.<br>Low freezing point.<br>Emulsifier.<br>Derived from all-natural materials. |
| Lard | Less than 1-10% | High smoke point.<br>Medium to low viscosity lubricant.<br>Locks out moisture.<br>Derived from all-natural materials. |

-continued

| INGREDIENTS | PERCENT RANGES | DESCRIPTION |
|---|---|---|
| Beeswax | Less than 1-5% | High smoke point.<br>Low viscosity lubncant.<br>Insoluble to water and many acids.<br>Locks out moisture.<br>Provides protection.<br>Derived from all-natural materials. |
| Avocado Oil | 5-20% | High Smoke Point.<br>Medium to high viscosity lubricant.<br>Low rate of oxidation.<br>Derived from all-natural materiais. |

In one example, the all-natural multi-purpose cleaner, lubricant and protectant composition includes the following components.

| | Amount | Percent | % Range |
|---|---|---|---|
| Ethanol | 380 gr | 78.84% | 70-75% |
| D-Limonene | 36 gr | 7.47% | 5-10% |
| Avocado Oil | 44 gr | 9.13% | 10-15% |
| Lard | 19 gr | 3.94% | 1-5% |
| Beeswax | 3 gr | 0.62% | Less than 1% |
| | 482 gr | 100.00% | |

In one example, the all-natural multi-purpose cleaner, lubricant and protectant composition includes the following components.

| | Amount | Percent | % Range |
|---|---|---|---|
| Ethanol | 358 gr | 74.27% | 70-75% |
| D-Limonene | 36 gr | 7.47% | 5-10% |
| Avocado Oil | 66 gr | 13.69% | 10-15% |
| Lard | 19 gr | 3.94% | 1-5% |
| Beeswax | 3 gr | 0.62% | Less than 1% |
| | 482 gr | 100.00% | |

Process

In embodiments, the following process may be followed to manufacture the all-natural multi-purpose cleaner, lubricant and protectant composition.

Step 1:

1.1—Add the Beeswax and the deodorized Lard into a 30-gallon Stainless Steel tank.

1.2—Wrap the heat belt around the tank and turn the switch to the ON position.

1.3—Mix the two components occasionally until they are completely melted (around 140 F).

1.4—Add the D-Limonene and the Avocado Oil while leaving the heat belt ON.

Step 2:

2.1—While the above process is heating up, add the Ethanol to a 330-gallon mixing tank (tote).

2.2—Turn ON the mixer.

2.3—While the mixer is ON, add the contents from Step 1 to the tank (tote).

2.4—Mix until the composition is uniform.

Step 3:

3.1—Attach the tank (tote) to the filling equipment.

3.2—Start the filling process.

3.3—Since the composition tends to separate, a portable handheld mixer agitates the batch in the tank (tote). The composition is mixed for 30 seconds to one minute every 15-20 minutes to assure consistency.

The all-natural multi-purpose cleaner, lubricant and protectant composition may be of viscosity to facilitate being sprayed from a pump sprayer bottle or as an aerosol. In one example, the viscosity is about 1.0-1.2 cP at 25° C.

The disclosed all-natural multi-purpose cleaner, lubricant and protectant composition may be stored in a plastic bottle with fine mist sprayer to facilitate application. The bottle is shaken prior to use to ensure the components are mixed. The all-natural multi-purpose cleaner, lubricant and protectant composition mixture may be sprayed and wiped off for cleaner or applied as needed and worked into moving parts for protection and lubrication.

Unlike other cleaning products, the disclosed all-natural multi-purpose cleaner, lubricant and protectant composition is a concentrated formula (contains 100% active components) and has a light citrus scent.

The all-natural multi-purpose cleaner, lubricant and protectant composition utilizes all-natural components. As a cleaner, the unique formulation of all-natural components penetrates and spreads into every pit and crevice to undercut contamination and lift residue away. Leaving a long-lasting lubricating film, the unique formulation of all-natural components dramatically reduces adhesion of sand, grit, or other abrasives that cause wear and failure. And as a protectant, this unique formulation of all-natural components protects metal surfaces from moisture and other contaminants.

As used herein, the term "weight percent" is meant to refer to the quantity by weight of a compound and/or component in a composition as the quantity by weight of a constituent component of the composition as a percentage of the weight of the total composition. The weight percent can also be calculated by multiplying the mass fraction by 100. The "mass fraction" is the ratio of one substance of a mass m1 to the mass of the total composition mT such that weight percent=(m1/mT)*100.

All ranges disclosed herein are inclusive of the recited endpoint and independently combinable (for example, the range of "from 50 mg to 500 mg" is inclusive of the endpoints, 50 mg and 500 mg, and all the intermediate values). The endpoints of the ranges and any values disclosed herein are not limited to the precise range or value; they are sufficiently imprecise to include values approximating these ranges and/or values.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed is:

1. An all-natural multi-purpose cleaner, lubricant, and protectant composition, comprising:

70-75 percent by weight ethanol;

5-10 percent by weight d-limonene;

1-5 percent by weight lard;

greater than 0 percent and less than 1 percent by weight beeswax; and 10-15 percent by weight avocado oil, wherein the composition comprises a viscosity of 1.0-1.2 cP at 25° C.

2. The all-natural multi-purpose cleaner, lubricant, and protectant composition as recited in claim 1, wherein the ethanol comprises 380 grams.

3. The all-natural multi-purpose cleaner, lubricant, and protectant composition as recited in claim 1, wherein the d-limonene comprises 36 grams.

4. The all-natural multi-purpose cleaner, lubricant, and protectant composition as recited in claim 1, wherein the lard comprises 19 grams.

5. The all-natural multi-purpose cleaner, lubricant, and protectant composition as recited in claim 1, wherein the beeswax comprises 3 grams.

6. The all-natural multi-purpose cleaner, lubricant, and protectant composition as recited in claim 1, wherein the avocado oil comprises 44 grams.

7. The all-natural multi-purpose cleaner, lubricant, and protectant composition as recited in claim 1, wherein the ethanol comprises 358 grams.

8. The all-natural multi-purpose cleaner, lubricant, and protectant composition as recited in claim 7, wherein the avocado oil comprises 66 grams.

9. The all-natural multi-purpose cleaner, lubricant, and protectant composition as recited in claim 1, wherein the viscosity is sprayable from a spray bottle.

10. A process to manufacture an all-natural multi- purpose cleaner, lubricant, and protectant composition, comprising:

heating beeswax and deodorized lard to about 140 F until melted;

mixing in d-limonene and avocado oil to the melted beeswax and deodorized lard while heating;

mixing in the heated d-limonene, avocado oil, beeswax and deodorized lard to ethanol until the composition uniform;

intermittently mixing the composition for 30 seconds to one minute every 15-20 minutes; and filling a spray bottle with the composition, wherein the composition comprises a viscosity of 1.0-1.2 cP at 25° C.

11. An all-natural multi-purpose cleaner, lubricant, and protectant composition, consisting of:

70-75 percent by weight ethanol;

5-10 percent by weight d-limonene;

1-5 percent by weight lard;

greater than 0 percent and less than 1 percent by weight beeswax; and 10-15 percent by weight avocado oil, wherein the composition is of a viscosity of 1.0-1.2 cP at 25° C.

* * * * *